(12) United States Patent
Maeda

(10) Patent No.: US 8,102,582 B2
(45) Date of Patent: Jan. 24, 2012

(54) ULTRA-SHORT PULSE SCANNING OPTICAL SYSTEM

(75) Inventor: Patrick Y. Maeda, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 12/946,628

(22) Filed: Nov. 15, 2010

(65) Prior Publication Data

US 2011/0058241 A1 Mar. 10, 2011

Related U.S. Application Data

(63) Continuation of application No. 11/611,342, filed on Dec. 15, 2006, now Pat. No. 7,911,668.

(51) Int. Cl.
*G02B 26/08* (2006.01)

(52) U.S. Cl. .................................. 359/206.1; 359/662

(58) Field of Classification Search .................. 359/662, 359/1–226.2
See application file for complete search history.

(56) References Cited

U.S. PATENT DOCUMENTS

| 5,835,280 A | 11/1998 | Griffith |
| 5,969,877 A | 10/1999 | Maeda |
| 2004/0231682 A1 | 11/2004 | Stolz et al. |

*Primary Examiner* — James Phan
(74) *Attorney, Agent, or Firm* — Marger Johnson & McCollom, P.C.

(57) ABSTRACT

A scanning optical system including an optical source configured to generate an ultra-short light pulse, a dispersion compensation system disposed such that the ultra-short light pulse travels through the dispersion compensation system, an optical deflector configured to rotate about an axis such that the ultra-short light pulse is deflected through a scan angle, and an f-theta scan lens having a group delay (GD) variation versus relative pupil height and group delay dispersion (GDD) variation versus the scan angle that are substantially minimized. The f-theta scan lens is disposed such that the ultra-short pulse is incident on the f-theta scan lens.

5 Claims, 7 Drawing Sheets

US 8,102,582 B2

ULTRA-SHORT PULSE SCANNING OPTICAL SYSTEM

CROSS-REFERENCE TO RELATED APPLICATIONS

This is a Continuation of U.S. patent application Ser. No. 11/611,342, filed Dec. 15, 2006, now U.S. Pat. No. 7,911,668, entitled ULTRA-SHORT PULSE SCANNING OPTICAL SYSTEM, the disclosure of which is herein incorporated by reference in its entirety.

BACKGROUND

A pulse of light has an optical spectrum that is inversely related to the duration of the pulse. As the duration of the pulse decreases, the width of the optical spectrum increases. Thus, a relatively short pulse has a relatively wide optical spectrum.

Conventional optical scanning systems are optimized for monochromatic or near monochromatic light. The width of the optical spectrum of monochromatic or near monochromatic light is negligible relative to the chromatic aberrations within the optics of the system and the dispersive effects of the optical materials from which the optical elements are constructed. In contrast, ultra-short pulse optical sources generate ultra-short pulses of light. Such an ultra-short pulse results in an optical spectrum having a width that is non-negligible relative to the chromatic aberrations and dispersive effects within the optics of the system.

Chromatic aberrations of optics can affect the temporal and spatial profiles of ultra-short pulses. For example, chromatic aberrations of a scan lens can vary versus a scan angle in a scanning optical system. Conventional laser scanning optical systems are designed to direct and focus narrowband or single frequency laser light because the laser modulation rates in these systems are much lower than with ultra-short pulse lasers. As a result, chromatic aberrations and material dispersion have a negligible impact on such systems.

In contrast, because of the relatively wide, spectrum of ultra-short pulses, ultra-short pulses may be adversely affected by the chromatic aberrations and material dispersion. As a result, an ultra-short pulse will be distorted both spatially and temporally after passing through a conventional laser scanning optical system.

Because of the effects of chromatic aberrations, some ultra-short pulse scanning optical systems are limited to scanning through a very small scan angle if at all. Alternatively, the entire optical system or the object being illuminated is moved such that distortions due to scanning are not introduced. However, because of the bulk of the entire optical system or the object being illuminated, the scan rate is limited.

Accordingly, there remains a need for an improved scanning optical system capable of scanning over a larger image field at a faster scan rate.

SUMMARY

An embodiment includes a scanning optical system including an optical source configured to generate an ultra-short light pulse, a dispersion compensation system disposed such that the ultra-short light pulse travels through the dispersion compensation system, an optical deflector configured to rotate about an axis such that the ultra-short light pulse is deflected through a scan angle, and an f-theta scan lens having a group delay (GD) variation versus relative pupil height and group delay dispersion (GDD) variation versus the scan angle that are substantially minimized. The f-theta scan lens is disposed such that the ultra-short pulse is incident on the f-theta scan lens.

Another embodiment includes an f-theta scan lens including multiple lenses, where at least one lens having a material different from another lens of the lenses. An optical response of the lenses has a group delay (GD) variation versus relative pupil height and group delay dispersion (GDD) variation versus the scan angle that are substantially minimized.

DETAILED DESCRIPTION

Figure 1:
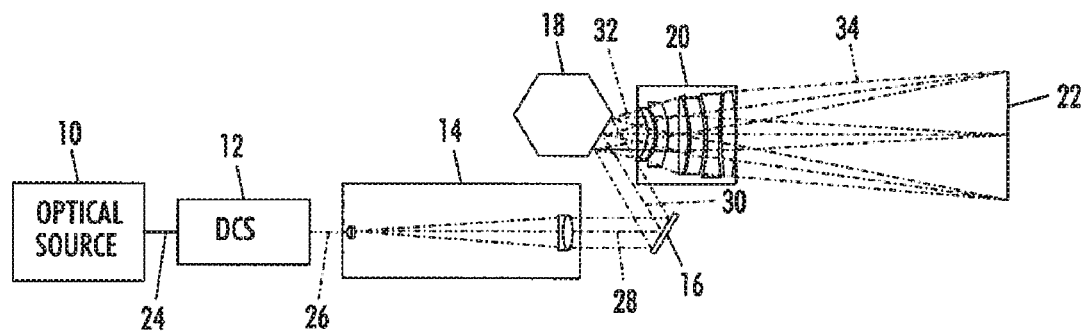
FIG. 1 is scanning optical system according to an embodiment.

One example of an application of an ultra-short pulse scanning optical system is ultra-short pulse materials processing. Ultra-short pulse materials processing enables clean shallow ablation of many materials including transparent materials. In such processing relatively small spots (for example on the order of 10 microns) are produced over relatively large scan ranges (for example on the order of 6 to 8 inches). An example of a use of such a process is in semiconductor or photovoltaic cell processing.

In such processes, direct write ablation using an ultra-short pulse scanning optical system can, with a single step, replace resist spinning, lithographic masking, developing, ashing, baking, etching, rinsing, stripping, drying, or other like steps commonly used to pattern semiconductor materials. As a result, the costs of manufacturing are reduced. In addition, the throughput may be increased.

Conventional optical scanning systems are designed for monochromatic or near-monochromatic light. Lasers used in this system are typically single frequency emission light sources and the minimum pulse widths are on the order of nanoseconds. In contrast, ultra-short pulses have pulse widths less than about one picosecond (ps). For example, such pulse widths may be less than 500 femtoseconds (fs). The optical spectrum of such an ultra-short pulse is centered around the center wavelength of the laser. However, the duration of the ultra-short pulse results in a spectral width that is non-negligible.

For example, for a Gaussian pulse shape, $\Delta\lambda \approx (\lambda 2/c)(0.414/\Delta t)$ where $\Delta t$ is the pulse width. As a result, a Gaussian pulse with a full width half maximum (FWHM) pulse width $\Delta t=100$ fs and center wavelength $\lambda=800$ nm will have a spectral bandwidth of $\Delta\lambda \approx 8.32$ nm. If the FWHM pulse width is reduced to $\Delta t=10$ fs, the spectral bandwidth increases to $\Delta\lambda \approx 88.32$ nm. By comparison, the spectral bandwidth for a nanosecond pulse width is on the order of $8.8 \times 10^{-4}$ nm.

Materials used for optical components can have an index of refraction that varies according to frequency. As a result, there are multiple manifestations of distortion in a scanning optical system that must be corrected or compensated. Because of the wavelength dependence of the index of refraction, spectral components of an ultra-short pulse may exit an optical element at different angles. As a result, different spectral components may be focused at different locations. For example, longitudinal or axial chromatic aberration and tangential or lateral chromatic aberration introduce wavelength dependent spatial distortion. Axial chromatic aberration causes light of different wavelengths to come to a focus at different distances from the lens along the optical axis. Lateral chromatic aberration is the variation in image height of focused spots of light having different wavelengths, taken at a specified focal plane. Both types of chromatic aberration spread broadband light over a larger spatial region than what would be obtained with monochromatic light.

The spectral bandwidth associated with ultra-short pulses also results in spatial and temporal distortion of the pulse after is propagates through the optical system since the optical component materials, typically glass, are dispersive. The effects of dispersive materials include propagation time difference (PTD) and group velocity dispersion (GVD). The pulse front, which coincides with the surface containing the peak of the pulse, moves with group velocity ($v_g$), and is delayed with respect to the phase front moving with phase velocity ($v_p$). The propagation time difference, PTD, is the delay between the pulse front and phase front. Pulse broadening also occurs due to the group velocity dispersion (GVD) of the material.

$$\omega = \frac{2\pi c}{\lambda} \tag{1}$$

$$k = \frac{2\pi n}{\lambda} \tag{2}$$

$$v_p = \frac{c}{n} \tag{3}$$

$$v_g = \frac{d\omega}{dk} = \frac{c}{n - \lambda \frac{dn}{d\lambda}} \tag{4}$$

$$PTD \propto \frac{\lambda}{c} \frac{dn}{d\lambda} \tag{5}$$

Equation 6 describes the accumulated spectral phase $\phi(\omega)$ of a pulse traveling a distance L through a dispersive medium of refractive index $n(\omega)$. The spectral bandwidth associated with ultra-short pulses results in spatial and temporal distortion of the pulse after it passes through imaging optics.

$$\varphi(\omega) = \frac{\omega}{c} n(\omega) L \tag{6}$$

Furthermore, the character of the spatial and temporal distortion may vary due to the deflection of the beam in the scanning optical system. For example, the spatial and temporal distortion may vary across a scan angle of a scanning optical system.

The dispersive effects on ultra-short pulses by optical materials and elements can be characterized using a Taylor series expansion of the frequency dependent phase of the pulse. Equations 7-10 illustrate the Taylor series expansion of the phase response of an optical element.

$$\varphi(\omega) = \varphi(\omega_0) + \left(\frac{d\varphi}{d\omega}\right)_{\omega_0}(\omega - \omega_0) + \tag{7}$$
$$\frac{1}{2!}\left(\frac{d^2\varphi}{d\omega^2}\right)_{\omega_0}(\omega - \omega_0)^2 + \frac{1}{3!}\left(\frac{d^3\varphi}{d\omega^3}\right)_{\omega_0}(\omega - \omega_0)^3 + \Lambda$$

$$\varphi(\omega) = \varphi(\omega_0) + \beta_1(\omega - \omega_0) + \tag{8}$$
$$\frac{1}{2!}\beta_2(\omega - \omega_0)^2 + \frac{1}{3!}\beta_3(\omega - \omega_0)^3 + \frac{1}{4!}\beta_4(\omega - \omega_0)^4 + \Lambda$$

$$\omega = \frac{2\pi c}{\lambda} \tag{9}$$

$$d\omega = -\frac{2\pi c}{\lambda^2} d\lambda \tag{10}$$

The functional dependence of refractive index, n, with respect to wavelength, for optical glass is fairly well known using Sellmeier's equation and the corresponding glass data supplied by the optical glass manufacturers. Thus, it is convenient to use equations (6), (7), (8), (9), and (10) to express the coefficients $\beta_n = d^n\phi/d\omega^n$ terms in the expansion as derivatives of refractive index with respect to the wavelength as shown in Equations (11) to (14).

$$\beta_1 = \frac{L}{c}\left[n(\lambda_0) - \lambda_0\left(\frac{dn}{d\lambda}\right)_{\lambda_0}\right] = GD \tag{11}$$

$$\beta_2 = \frac{L}{c}\left(\frac{\lambda_0}{2\pi c}\right)\left[\lambda_0^2\left(\frac{d^2 n}{d\lambda^2}\right)_{\lambda_0}\right] = GDD \tag{12}$$

$$\beta_3 = -\frac{L}{c}\left(\frac{\lambda_0}{2\pi c}\right)^2\left[3\lambda_0^2\left(\frac{d^2 n}{d\lambda^2}\right)_{\lambda_0} + \lambda_0^3\left(\frac{d^3 n}{d\lambda^3}\right)_{\lambda_0}\right] = TOD \tag{13}$$

$$\beta_4 = \frac{L}{c}\left(\frac{\lambda_0}{2\pi c}\right)^3\left[12\lambda_0^2\left(\frac{d^2 n}{d\lambda^2}\right)_{\lambda_0} + 8\lambda_0^3\left(\frac{d^3 n}{d\lambda^3}\right)_{\lambda_0} + \lambda_0^4\left(\frac{d^4 n}{d\lambda^4}\right)_{\lambda_0}\right] = FOD \tag{14}$$

In these expressions, L is the path length through the air space or glass material, c is the speed of light, $\omega_0$ is the center frequency of the pulse, and $\lambda_0$ is the center wavelength (in vacuum) of the pulse. GD is the path length divided by the group velocity. It represents a measure of the propagation time of the pulse front passing through the optical element and indicates that the phase front of the pulse is delayed relative to the phase front. GVD is comprised of different orders, the GDD, TOD, and FOD. GDD is the group delay dispersion or second order dispersion through the optical element. TOD is the third order dispersion through the optical element. FOD is the fourth order dispersion through the optical element. The GDD and TOD are positive for most optical glasses in the visible and near infrared (IR) spectral regions.

In examples of the effects of these components on a pulse through the optical element, GD delays the pulse front relative to the phase front, GDD broadens the pulse, TOD asymmetrically distorts the pulse, and FOD broadens the pulse.

Determining the GD, GDD, TOD, and FOD for an entire optical system can be obtained by ray tracing through the system to acquire the various path lengths, L, through each air space and optical element. Equations (11) to (14) can then be used to compute the values for these quantities for each element and sum them to obtain the total amount for the system.

The dispersive effects of any additional filters, prisms, mirrors, and other elements can be accounted for and added in a similar manner. For example, the GD, GDD, TOD, and FOD, can be determined for transmissive and reflective optical coatings. Most commercial thin film analysis software can readily calculate these quantities for a given coating design.

As described above, the variability of the index of refraction may result in a variable focal length versus wavelength. However, even if different spectral components of an ultra-short pulse are focused at the same spatial location, the time taken by the ultra-short pulse can vary according to other spatially related factors. For example, the distance from an axis of a lens may vary the group delay response of the lens. Sections of a pulse front of the ultra-short pulse traverse different path lengths in the lens material depending on the radial height from the optical axis. This results in radially varying GD which produces an exiting pulse front surface that is non-spherical and not concentric about the focus point of the lens. Accordingly, there is a temporal distortion of the pulse at the focal plane.

In addition to the time taken to reach the focal point, pulses traveling particular paths through the lens may experience different GVD related distortions. For example, as different sections of the pulse front traverse different path lengths in the lens material, varying amounts of group delay dispersion are accumulated depending on the radial height from the optical axis. This produces different amounts of pulse broadening along the pulse front and results in temporal distortions of the pulse at the focal plane even if radial variation of GD is eliminated.

Pulse delay and pulse broadening are relatively uniform over the beam cross-section for an achromatic lens. Therefore, for an achromatic lens, a portion of the pulse broadening effects can be compensated for by the addition of a dispersive element. In one example, the dispersive element has a negative amount of GDD corresponding to the positive amount of GDD in the remainder of the optical system. An achromatic lens or group of lenses can therefore greatly minimize the radially varying group delay and radially varying group delay dispersion exhibited by a lens or group of lenses that suffer from chromatic aberration. The effect of GDD on the broadening of a Gaussian pulse is given in equation 15 where the FWHM pulse width is $\tau$.

$$\tau_{output} = \tau_{input} \sqrt{1 + \frac{GDD^2}{\tau_{input}^4} 16(\ln(2))^2} \quad (15)$$

FIG. 1 is scanning optical system according to an embodiment. In this embodiment, the scanning optical system can scan and focus ultra-short pulses of light. In particular, the light pulse can be less than 1 ps in duration. The scanning optical system includes an optical source 10, a dispersion compensation system 12, beam expansion optics 14, a mirror 16, an optical deflector 18, and an f-theta scan lens 20. Although an image plane 22 has been illustrated, the scanning optical system 22 can, but need not include such an image plane 22. For example, a semiconductor wafer being etched by the scanning optical system may take the place of the image plane 22.

The optical source 10 generates an ultra-short pulse of light 24. An ultra-short pulse of light 24 generally has a duration less than 1000 fs. Examples of durations of ultra-short pulses of light 24 are 1000 fs, 100 fs, and 10 fs. One example of such an optical source 10 is a laser that can generate the ultra-short pulse of light 24. In another example, the optical source 10 can include a laser that cannot generate an ultra-short pulse of light. However, such an optical source 10 can also include pulse shaping optics to convert the longer duration pulse into an ultra-short pulse 24.

The dispersion compensation system 12 (DCS) is disposed such that the ultra-short pulse 24 travels through the DCS 12. In this embodiment, the DCS adds amounts and types of group velocity dispersion. For example, the DCS 12 may introduce appropriate amounts of GDD and TOD that completely or partially negate the amounts found in the rest of the optical system. As a result, the DCS 12 minimizes distortions of the ultra-short pulses that would otherwise be induced by the dispersive effects of the other optical components in the system. Thus, phases of the ultra-short pulse 24 are adjusted to generate the dispersion-compensated ultra-short pulse 26. Although the ultra-short pulse 26 is described as dispersion-compensated, the ultra-short pulse 26 may actually be pre-distorted such that through subsequent distortion introduced by other optical elements, the resulting pulse has a minimum amount of GVD related distortion.

Beam expansion optics 14 are configured to expand the width or diameter of the beam of the ultra-short pulse 26 into an ultra-short pulse 28 having a larger diameter. The beam expansion optics 14 can be achromatic. Thus, the beam expansion optics 14 would introduce a reduced amount of spatially related group delay and group delay dispersion variation. Examples of the beam expansion optics 14 include an afocal telescope of the Galilean type, Keplerian type, or the like.

In one embodiment, an output beam from an ultra-short pulse laser has a $1/e^2$ diameter of 1 to 3 mm and a $TEM_{00}$ $M^2$ value of 1.2 to 1.4. The corresponding beam expansion optics 14 expand the beam between about 5× to 20× prior to the scan optics to achieve the desired focused spot diameter at the image plane. Although particular examples of values of parameters of beam expansion optics 14 have been described, the beam of the ultra-short pulse may be expanded as desired for the desired spot diameter.

Since the GDD and TOD are typically positive for most optical glasses, most of the deleterious effects of dispersion on ultra-short pulses cannot be compensated by glass selection (e.g., using combinations of optical glasses with negative and positive amounts of GDD and TOD). However, combinations of prism pairs and grating pairs can be used to provide amounts of negative GDD and TOD to compensate for dispersion effects in the rest of the optical system. In addition, chirped multilayer mirrors and double-chirped multilayer mirrors can be used for limited GDD compensation as well.

The mirror 16 deflects the ultra-short pulse 28 on to the optical deflector 18. Although a single mirror has been illustrated, any number of mirrors including zero mirrors may be used as desired. For example, if the ultra-short pulse 28 from the beam expansion optics 14 is directed towards the optical deflector 18, a mirror 16 may be omitted. In another example, the reflected ultra-short pulse 30 from the mirror 16 may be reflected again on a second mirror (not shown) and directed towards the optical deflector 18.

The optical deflector 18 is configured to deflect the ultra-short light pulse through a scan angle. The optical deflector 18 can be, for example, a rotating polygon mirror. Thus, the optical deflector 18 is configured to rotate about an axis such that the ultra-short pulse 30 is deflected through the scan angle. In another example, the optical deflector 18 can be a galvanometer mirror.

The deflected ultra-short pulse 32 is directed towards the f-theta scan lens 20. The f-theta scan lens 20 has a substantially uniform group delay variation versus the scan angle and is disposed such that the ultra-short pulse 32 is incident on the f-theta scan lens 20. The f-theta scan lens 20 is achromatic to minimize radially varying group delay and radially varying group delay dispersion, and to minimize lateral and axial chromatic aberrations.

Although the term achromatic may be interpreted as having equivalent group delays or chromatic aberrations only at two discrete wavelengths, as used in this discussion, achromatic includes an optical element with equivalent properties at more than two wavelengths. For example, an achromatic lens as used herein would include an apochromatic lens with equivalent properties at three discrete wavelengths. Furthermore, achromatic can also describe an optical element with no two wavelengths having equivalent properties, but with the variation of those properties across a wavelength range being within a desired tolerance.

The f-theta scan lens 20 is designed to have an f-θ scan characteristic that linearizes the scanning motion across the image plane 22 to produce a substantially constant scan velocity. In addition, the f-theta scan lens 20 is designed to minimize the radial variation of GD and GDD, and minimize the GDD variation across the scan. Thus, for spatial parameters of the scanning optical system such as beam diameter and scan angle, the group delay and group velocity dispersion vary substantially uniformly over those spatial parameters.

It should be noted that this does not require that the group velocity dispersion related parameters for any given spatial state is a minimum. The uniformity is across the spatial parameters. For example, a given f-theta scan lens 20 may have a high GDD indicating a large potential for pulse broadening. However, that high amount of GDD is substantially uniform across spatial parameters such as the radial pupil height or scan angle.

As used here, substantially uniform is a degree of uniformity that does not distort the pulse beyond the specification of the system implementing the scanning optical system. As will be described below, GDD and TOD can be compensated with the DCS 12. In addition, some spatially related variation in GDD may be compensated by a chirped mirror. Thus, in one embodiment, the uniformity of GDD is such that non-uniformity may be compensated by the chirped mirror. Alternatively, the residual GDD may be acceptable for the scanning optical system.

Figure 2:
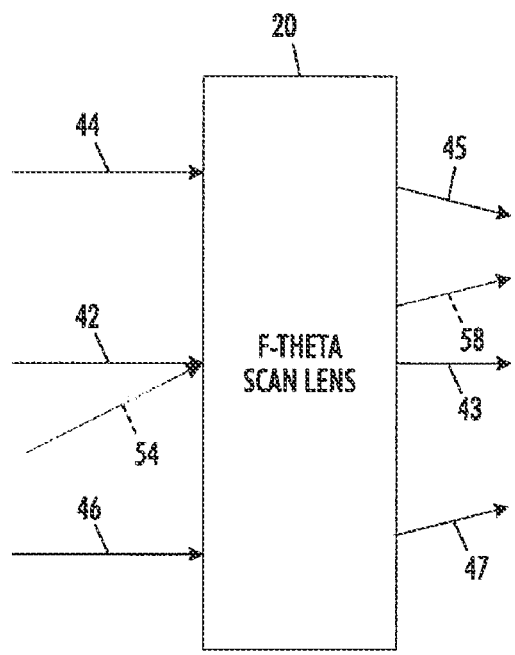
FIG. 2 is an illustration of paths of various rays through an f-theta scan lens according to an embodiment.

FIG. 2 is an illustration of paths of various rays through an f-theta scan lens according to an embodiment. Rays 42, 44, and 46 represent rays within a beam of an ultra-short pulse 32 incident on the f-theta scan lens 20. In this example, the rays 42, 44, and 46 are parallel to the optical axis of the f-theta scan lens 20 which corresponds to a scan angle of 0 degrees. Rays 43, 45, and 47 indicate the exit path of corresponding rays 42, 44, and 46, respectively. Rays 42, 44, and 46 differ in that the corresponding locations of incidence on the f-theta scan lens 20 are offset from each other. This offset represents a relative radial offset or a relative radial pupil height.

In addition, ray 54 represents a ray within a beam of an ultra-short pulse 32 incident on the f-theta scan lens 20 with a scan angle different from 0 degrees. Ray 58 indicates the exit path of ray 54. Although illustrated as incident at the same point, rays 42 and 54 have different angles of incidence. This difference represents a different scan angle in the scanning optical system.

Figure 3:
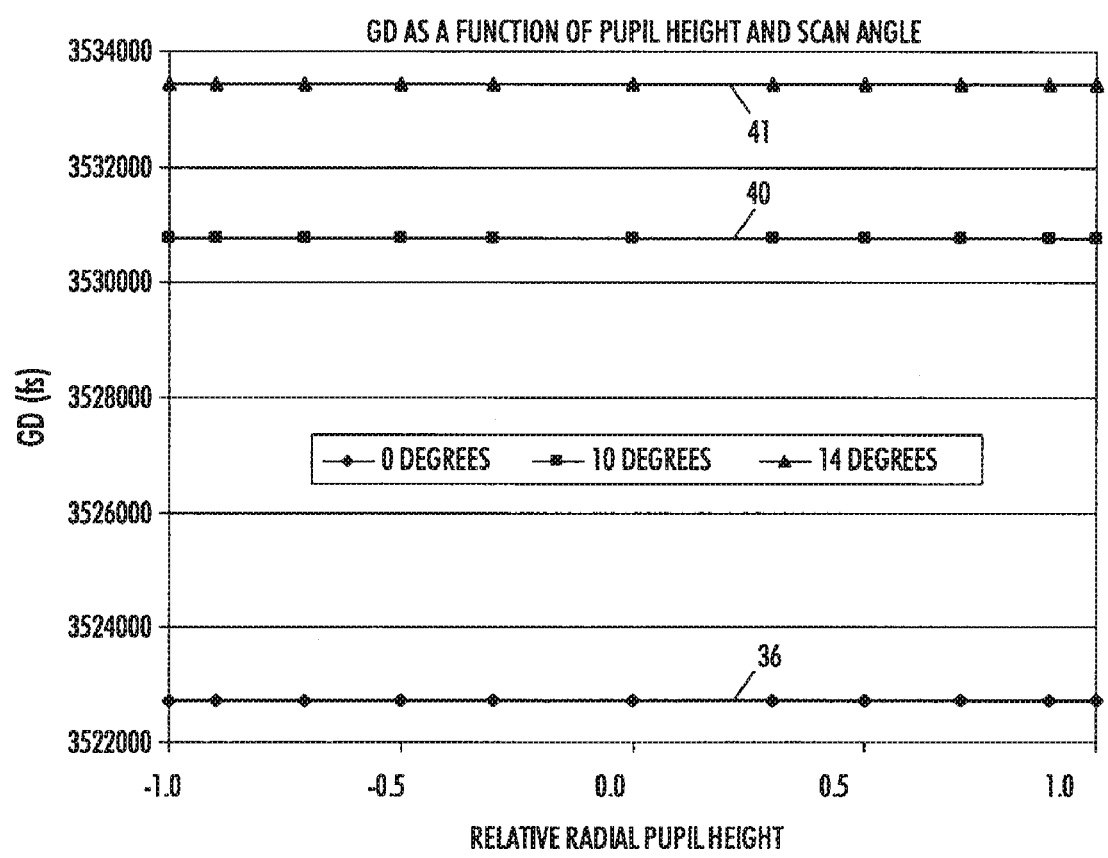
FIG. 3 is an illustration of the group delay (GD) versus relative radial offset or relative radial pupil height of the f-theta scan lens of FIG. 1 for various scan angles according to an embodiment.

FIG. 3 is an illustration of the group delay (GD) versus relative radial offset or relative radial pupil height of the f-theta scan lens 20 of FIG. 1 for various scan angles according to an embodiment. Each of curves 36, 40, and 41 represents GD of the scan lens versus relative radial pupil height. The difference between curves 36, 40, and 41 represents the change in GD due to scan angle.

Figure 4:
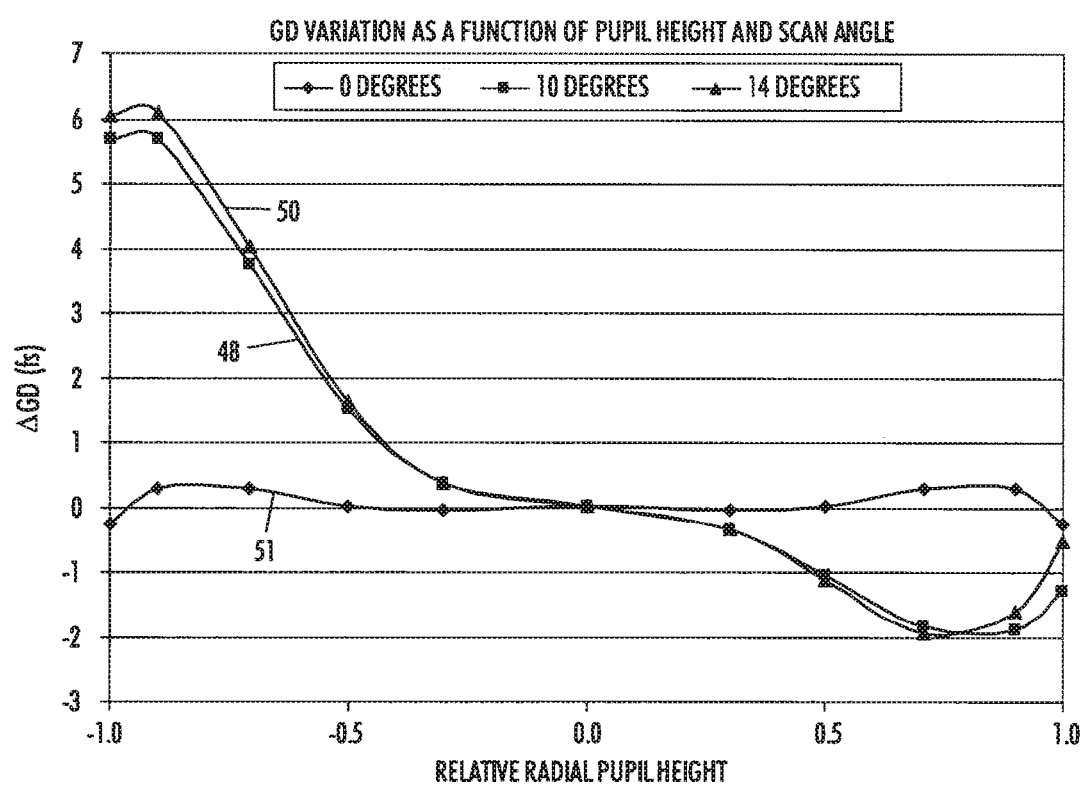
FIG. 4 illustrates a difference in group delay (GD) variation versus relative radial offset or relative radial pupil height of a scanning optical system of FIG. 1 for various scan angles according to an embodiment.

FIG. 4 illustrates a difference in group delay (GD) variation versus relative radial offset or relative radial pupil height of a scanning optical system of FIG. 1 for various scan angles according to an embodiment. Curves 51, 48, and 50 correspond to curves 36, 40, and 41 of FIG. 3. However, in FIG. 4, curves 36, 40, and 41 of FIG. 3 have been normalized to have the same GD at 0 relative radial pupil height. As a result, the variation in GD may be seen with more detail.

In one embodiment, the f-theta scan lens 20 has a group delay variation and group delay dispersion versus relative radial pupil height that is substantially a minimum. In another embodiment, the f-theta scan lens has a group delay dispersion variation versus the scan angle that is substantially a minimum. By minimizing the group delay dispersion variation over such parameters, whether individually or in combination, GVD compensation that does not vary over such parameters can be used.

In another embodiment, the group delay variation being substantially a minimum means that the difference in GD variation is substantially a minimum, however a difference in GD may exist over scan angles. Thus, as the scan angle changes, ultra-short pulses may arrive at a different time, as indicated by the variation in GD versus scan angle, however, because of the substantially minimum GD variation as illustrated in FIG. 4, the ultra-short pulses have a minimum amount of distortion versus scan angle.

Figure 5:
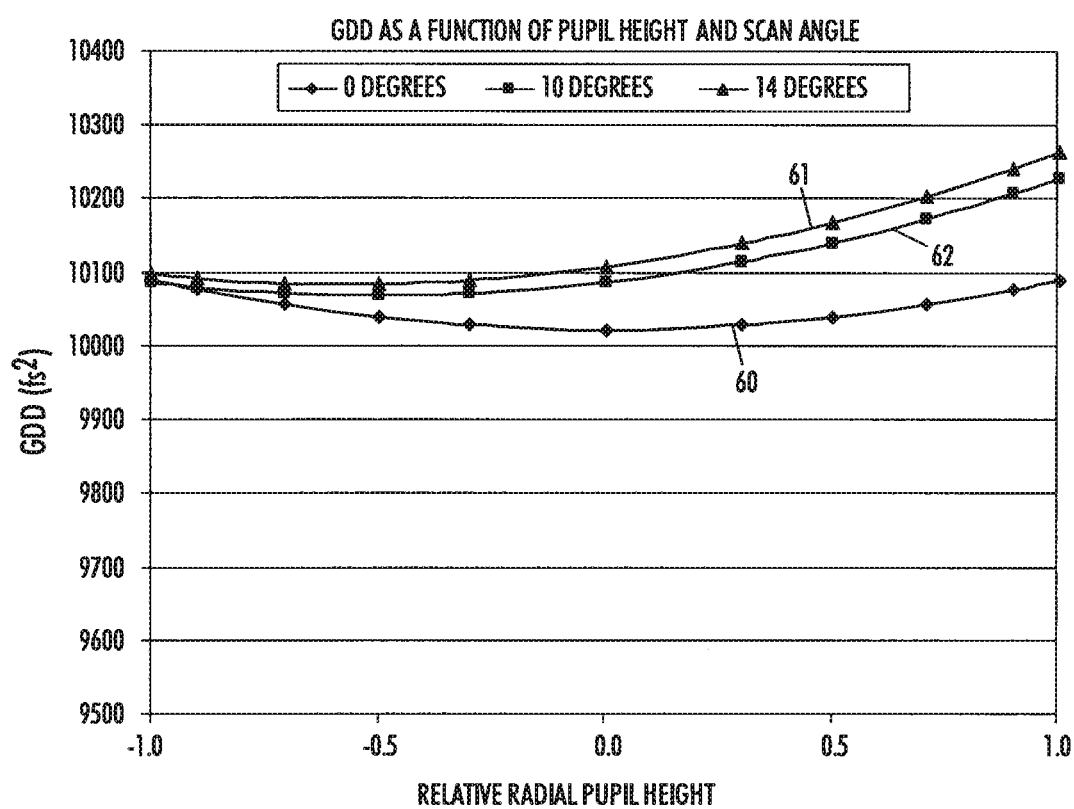
FIG. 5 is an illustration of the group delay dispersion (GDD) versus relative radial offset or relative radial pupil height of the f-theta scan lens of FIG. 1 for various scan angles.
Figure 6:
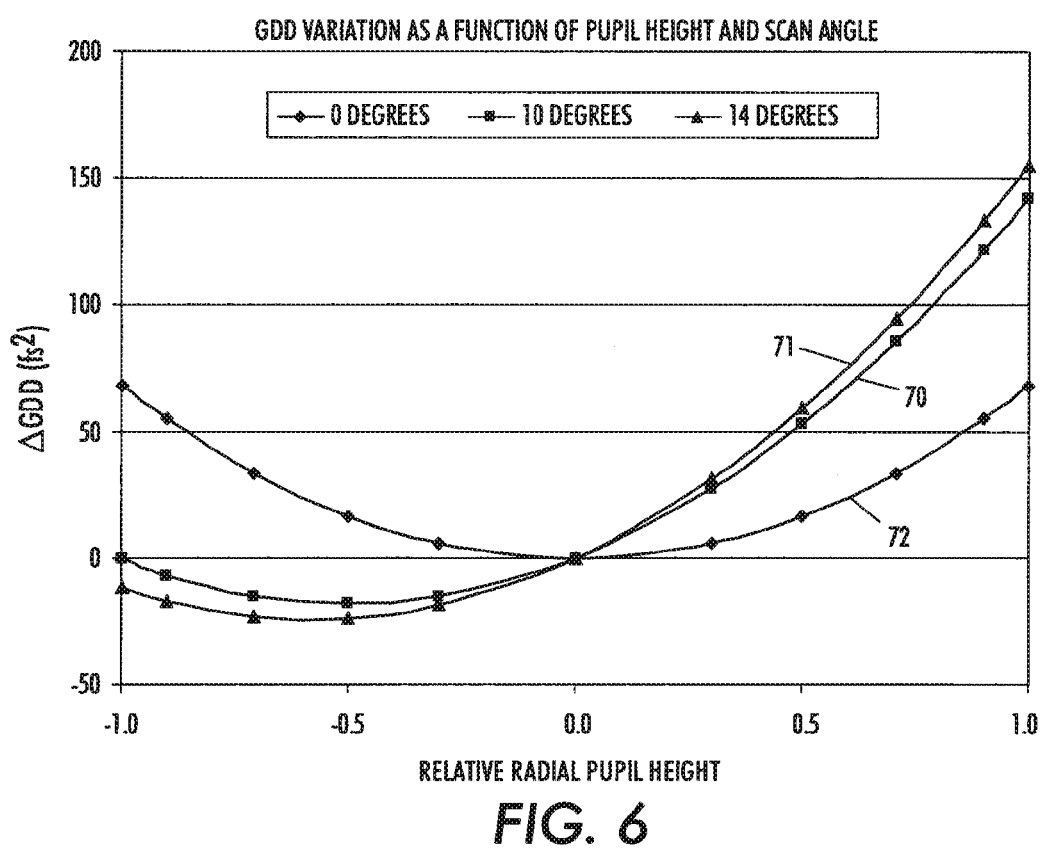
FIG. 6 is an illustration of a difference in group delay dispersion (GDD) variation versus relative radial pupil height of a scanning optical system for various scan angles according to an embodiment.

FIG. 5 is an illustration of the group delay dispersion (GDD) versus relative radial offset or relative radial pupil height of the f-theta scan lens 20 of FIG. 1 for various scan angles. Curves 60, 61, and 62 correspond to different scan angles. FIG. 6 is an illustration of a difference in group delay dispersion (GDD) variation versus relative radial pupil height of a scanning optical system for various scan angles according to an embodiment. Curves 70, 72, and 71 correspond to curves 60, 62, and 61 normalized at 0 relative radial pupil height.

In one embodiment, the f-theta scan lens has a GDD variation versus the scan angle that is substantially a minimum. As a result, when GDD is compensated, the remaining GDD versus scan angle will be the variation of GDD over the scan angle. Thus, the GDD of the scanning optical system is reduced to the residual amount of GDD variation.

To achieve the GDD of FIG. 6, the DCS 12 can add, for example, a negative amount of GDD such as about −10000 fs$^2$. An additional amount of GDD versus scan angle can be introduced by another GVD compensating component, such as a chirped mirror. As a result, the GDD of the scanning optical system can be Although in this example, an amount of GDD was added by the DCS 12 and other compensating components such that the GDD was minimized to be zero GDD at the center scan angle and 0 relative radial pupil height, in another example, an amount of GDD can be added such that a magnitude of the GDD versus scan angle is a minimum. For example, if an amount of GDD is added such that the GDD variation of the curves 70, 71, and 72 of FIG. 6 are shifted down by 60 fs$^2$, a peak to peak variation in GDD is reduced. As a result, a maximum amount of GDD affecting an ultra-short pulse in the scanning optical system during operation is minimized, even though a non-zero amount of GDD remains at the center of the scan angle, radial pupil height, or other spatial parameter.

In another embodiment, the f-theta scan lens 20 has a spatial chromatic aberration less than a depth of focus of the ultra short light pulse on an image plane. As described above, the variability of the index of refraction versus wavelength may also result in spatial distortions. By reducing such spatial distortions, the components of the pulse across the diameter of the f-theta scan lens 20 will be focused closer to the image plane 22.

In one embodiment, the image plane 22 is a flat image plane. However, the image plane may be shaped as desired. For example, the image plane 22 may be curved. As a result, the f-theta scan lens 20 would focus the ultra-short pulses on the curved image plane 22. Alternatively, the f-theta scan lens 20 can focus the ultra-short pulses on the curved image plane 22 as if it was a flat image plane as long as the distortion of the spot does not exceed a tolerance for the system. For example, the image plane 22 can be curved less than the depth of focus for the f-theta scan lens 20.

As a result of using such a configuration described above, the optical system can exhibit a linear scan characteristic with reduced lateral chromatic aberration, and possess field curvature and axial chromatic aberration levels that are smaller than the depth of focus of the beam at the image plane 22.

An embodiment also includes the use of the DCS 12 to provide amounts of GDD and TOD that completely or partially negate the amounts found in the rest of the scanning optical system. As a result, the DSC 12 minimizes distortions of the ultra-short pulses that would otherwise be induced by the dispersive effects of the other optical components in the system.

In one embodiment, the DCS 12 has a GDD that is an inverse of a GDD for the rest of the optics. As described above, the GDD may vary over scan angle, radial offset, or the like. As described above, such variations are minimized over the corresponding control parameter. Thus, the resulting GDD for the scanning optical system may not be eliminated, however, the GDD variation during operation is minimized. Thus, a single correction GDD may be introduced by the DCS 12 to correct the GDD of the rest of the optics. For example, the GDD may vary over the scan angle from 4500 $fs^2$ to 5500 $fs^2$. By adding in a GDD of −5000 $fs^2$, the GDD over the scan angle would vary from −500 $fs^2$ to 500 $fs^2$. Thus, the majority of the GDD is compensated, leaving a residual variation.

The value of the GDD compensation of the DCS 12 can be substantially between a minimum of a GDD versus scan angle for optics between the optical source and an image plane without the dispersion compensation system and a maximum of a GDD versus scan angle for the optics between the optical source and the image plane without the dispersion compensation system.

Although not illustrated, the scanning optical system can include optical filters, an aperture, fold mirrors, or other optical components.

Although the DCS 12 is used to minimize GDD, the remainder of the optics may still have uncompensated or residual levels of GDD across the scan angle that produce unacceptable levels of spatial and pulse distortion. To accommodate the uncompensated residual levels, one or more chirped multilayer mirrors (not shown) can be positioned in the optical path following the f-theta scan lens 20. Such chirped mirrors can be single-chirped, double-chirped, or the like. These types of mirrors can have GDD values that vary with incident angle or scan angle and therefore can be used to help offset the GDD values of the f-theta scan lens and other optical components that vary with scan angle. Furthermore, such chirped mirrors can form reflecting surfaces of the optical deflector 18. Thus, as the angle of incidence of the ultra-short pulse 30 on the optical deflector 18 changes, the GDD introduced by the optical deflector 30 changes, compensating for scan angle variations in GDD.

Although GDD has been described above in a variety of contexts, in such contexts, any of the other GVD related coefficients, such as TOD and FOD, and combinations of such coefficients may be interchanged with GDD. For example, both GDD and TOD may be substantially a minimum versus scan angle in an f-theta scan lens 20. In another example, the DCS 12 can include amounts of compensation to minimize the wavelength dependent TOD. Any combination of compensation for such components can be used.

In one embodiment, the beam expansion optics 14 is an 11.67× beam expander. The focal length of the f-theta scan lens 20 is 300 mm. The maximum scan angle is ±14°, corresponding to a scan line length of 146.6 mm. The center wavelength of the optical source 10 is 800 nm. The $1/e^2$ beam diameter of the optical source 10 is 2.5 mm and a $TEM_{00}$ $_M{}^2$ value of 1.2. The maximum diffraction limited FWHM (full width half maximum) spot size of 10.0 μm over a 5 inch scan line with dispersion compensation. The maximum variation in GDD and TOD across the scan is about 177 $fs^2$ and 277 $fs^3$ respectively.

Figure 7:
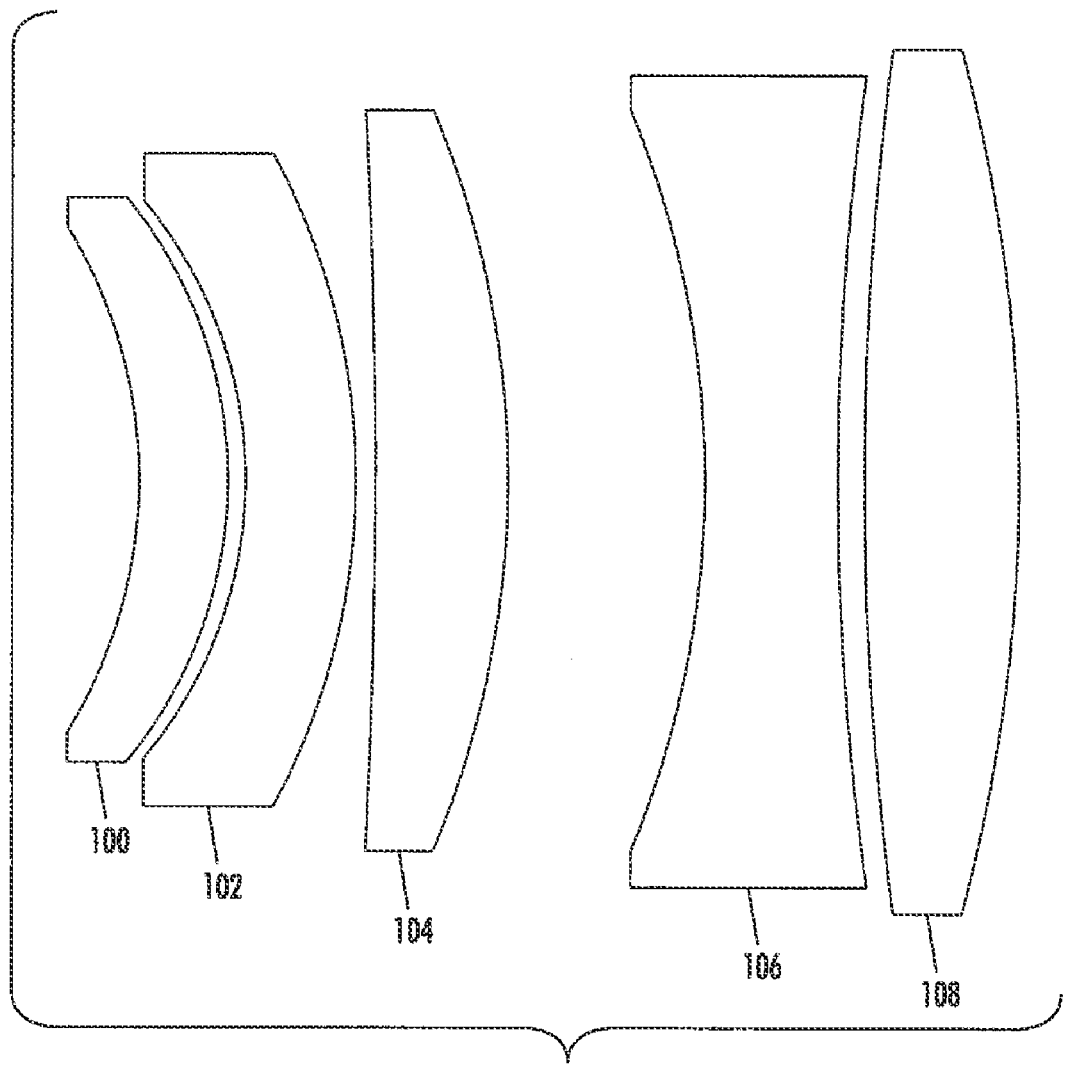
FIG. 7 is an f-theta scan lens according to an embodiment.

FIG. 7 is an f-theta scan lens according to an embodiment. In this embodiment, the f-theta scan lens includes a first lens 100, a second lens 102, a third lens 104, a fourth lens 106, and a fifth lens 108. The first lens 100 is a concave-convex lens. The second lens 102 is a concave-convex lens. The third lens 104 is a concave-convex lens. The fourth lens 106 is a concave lens. The fifth lens 108 is a convex lens.

In one embodiment, the f-theta scan lens 20 satisfies the following conditions:

$v_{d1} > v_{d3}$
$v_{d2} > v_{d3}$
$f_2 < 0$
$f_3 > 0$
$v_{d4} < v_{d5}$
$f_4 < 0$
$f_5 > 0$
$f_{g12} < 0$
$f_{g45} > 0$

In the above conditions, $v_d$ refers to the Abbe number of the glass that the lens is made of, $f$ refers to the focal length of the lens, $f_g$ refers to the lens group. The numerical subscripts indicate the lens number associated with the parameter. Thus, the Abbe number of lens 1 of scan lens 20 is $v_{d1}$. The Abbe number of lens 2 of scan lens 20 is $v_{d2}$. The Abbe number of lens 3 of scan lens 20 is $v_{d3}$. The Abbe number of lens 4 of scan lens 20 is $v_{d4}$. The Abbe number of lens 5 of scan lens 20 is $v_{d5}$. The focal length of lens 2 of scan lens 20 is $f_2$. The focal length of lens 3 of scan lens 20 is $f_3$. The focal length of lens 4 of scan lens 20 is $f_4$. The focal length of lens 5 of scan lens 20 is $f_5$. The focal length of the group of lenses formed by lens 1 and lens 2 is $f_{g12}$. The focal length of the group of lenses formed by lens 4 and lens 5 is $f_{g45}$.

Table 1 lists an example of values of radii of curvature of the lenses forming an f-theta scan lens 20. In addition, Table 1 lists examples of radii of curvature of first and second achromatic doublets forming an embodiment of the beam expansion optics 14, Furthermore, various thicknesses and relative distances are listed for the optical elements. Table 1 also lists lens materials use for the f-theta scan lens 20.

TABLE 1

| Component | Radius (mm) | Thickness or Distance (mm) | $n_d$ | $v_d$ | Glass |
|---|---|---|---|---|---|
| Achromatic | 13.64581 | 4.000 | 1.620900 | 60.3 | SK51 |
| Doublet 1 | −7.444678 | 3.000 | 1.705850 | 30.3 | SF64A |
| | −40.05432 | 240.793 | | | |
| Achromatic | 605.9911 | 7.500 | 1.705850 | 30.3 | SF64A |
| Doublet 2 | 97.46457 | 10.000 | 1.620900 | 60.3 | SK51 |
| | −154.9126 | 100.631 | | | |
| Fold Mirror | Infinity | 131.000 | | | MIRROR |
| Polygon Facet | Infinity | 50.000 | | | MIRROR |
| Scan Lens 1 | −55.601309 | 10.000 | 1.612720 | 58.6 | SK4 |
| | −50.614710 | 2.000 | | | |
| Scan Lens 2 | −49.266774 | 12.500 | 1.498311 | 65.1 | BK3 |
| | −77.750334 | 2.176 | | | |
| Scan Lens 3 | −796.392712 | 15.000 | 1.772500 | 49.6 | N-LAF34 |
| | −108.095897 | 24.601 | | | |
| Scan Lens 4 | −109.124514 | 15.000 | 1.784720 | 25.7 | N-SF11 |
| | 333.498593 | 3.000 | | | |
| Scan Lens 5 | 379.265401 | 17.500 | 1.880669 | 41.0 | LASFN31 |
| | −186.497305 | 320.211 | | | |

The scan angle variation in GDD and the radial offset variation in GDD of the f-theta scan lens 20 can be minimized through the selection of the lens attributes, lens materials, lens placement, or the like.

Figure 8:
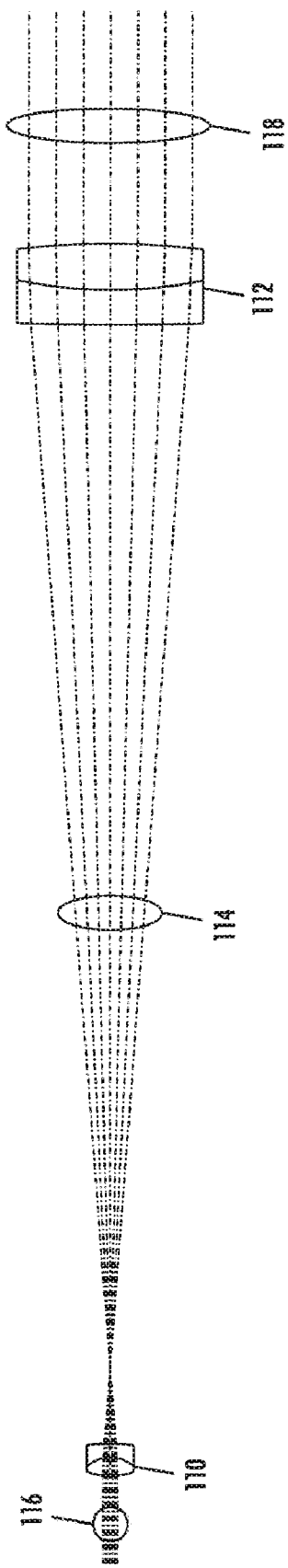
FIG. 8 illustrates beam expansion optics for a scanning optical system according to an embodiment.

FIG. 8 illustrates beam expansion optics for a scanning optical system according to an embodiment. The beam expansion optics includes a first achromatic doublet 110 and a second achromatic doublet 112. The first achromatic doublet 110 receives a beam 116 and focuses that beam into beam 114. The beam 114 is focused again into an expanded beam 118 by the second achromatic doublet 112. Although in this embodiment, the beam expansion optics is illustrated as a Keplerian beam expander, the focal lengths and positioning of the achromatic doublets 110 and 112 may form another type of beam expander, such as a Galilean beam expander.

Table 1 gives an example of dimensions and materials for the beam expansion optics. In addition, Table 1 describes the relative placement of the beam expansion optics relative to other optical components in the scanning optical system.

Although particular examples of focal lengths, beam expansion ratios, scan angle ranges, laser beam parameters, and the like have been described, any variety of combinations may be used according to the requirements of the scanning optical system.

In another embodiment, a scanning optical system includes means for generating an ultra short light pulse, means for adjusting the dispersion of the ultra short light pulse, means for deflecting the ultra short light pulse through a scan angle, and means for focusing the ultra short light pulse on a plane. The means for focusing has a substantially uniform group velocity dispersion versus scan angle. In addition, the means for focusing can have a substantially uniform group delay variation and group delay dispersion versus relative radial pupil height.

The means for generating an ultra short light pulse includes any device capable of generating a pulse of light having a duration less than about 1000 ps. An example of the means for generating an ultra short light pulse is the optical source 10 described above.

The means for adjusting the dispersion of the ultra short light pulse includes any device capable of adjusting the induced dispersion of a pulse of light. For example, the DCS 12 described above may be a means for adjusting the induced dispersion. In addition, chirped mirrors may be part of the means for adjusting the induced dispersion.

The means for deflecting the ultra short light pulse through a scan angle includes any device capable of deflecting a light beam. For example, the optical deflector 16, described above, can be the means for deflecting the ultra short light pulse.

The means for focusing includes any device, structure, system, or the like capable of focusing an ultra-short pulse of light where the group velocity dispersion variation is substantially uniform. In addition, the group delay dispersion variation of the means for focusing can be substantially uniform over relative radial pupil height, and the group delay dispersion of the means for focusing can be substantially uniform over a scan angle. An example of the means for focusing is an f-theta scan lens 20 described above. In addition, another example is a combination of the f-theta scan lens 20 and a chirped mirror or other structure capable of imparting angularly varying group delay distortion.

The term substantially a minimum has been used to describe the variation in GD and GVD coefficients versus a variety of parameters. Substantially a minimum is relative to the pulse width of the ultra-short pulse optical source. As the pulse width increases, a parameter that is substantially a minimum may have an increased variability. The limit on the variability to still be considered substantially a minimum is defined by its affect on the ultra-short pulse. Thus, a maximum amount of variability is an amount that will not significantly distort an ultra-short pulse.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. An f-theta scan lens, comprising:
    at least one lens formed such that the lens has a group delay, a group velocity dispersion, and a group delay dispersion when an ultra short light pulse is incident on the at least one lens at an angle of incidence;
    wherein a variation of the group delay dispersion versus many angles of incidence is substantially a minimum and the group delay and group velocity dispersion vary uniformly across spatial parameters for an optical system in which the f-theta scan lens is deployed.

2. The f-theta scan lens of claim 1, wherein:
    the optical response of the at least one lens has a group delay variation versus relative radial pupil height that is substantially a minimum.

3. The f-theta scan lens of claim 1 wherein:
    an optical response of the at least one lens has an n-th order dispersion variation versus the angle of incidence that is substantially a minimum.

4. The f-theta scan lens of claim 1, wherein:
    the optical response of the at least one lens has a dispersion coefficient variation versus relative radial pupil height that is substantially a minimum.

5. The f-theta scan lens of claim 1, wherein:
    an optical response of the at least one lens has a spatial chromatic aberration less than a depth of focus the at least one lens.

* * * * *